United States Patent
Aspen et al.

(10) Patent No.: US 10,371,547 B2
(45) Date of Patent: *Aug. 6, 2019

(54) DYNAMIC DISPLAY OF NAVIGATIONAL INFORMATION

(75) Inventors: Sven D. Aspen, Sherwood, OR (US); Andreas Sindlinger, Weinheim (DE); Patrick Wipplinger, Moerfelden-Walldorf (DE)

(73) Assignee: THE BOEING COMPANY, Chicago, IL (US)

( * ) Notice: Subject to any disclaimer, the term of this patent is extended or adjusted under 35 U.S.C. 154(b) by 636 days.

This patent is subject to a terminal disclaimer.

(21) Appl. No.: 12/359,079

(22) Filed: Jan. 23, 2009

(65) Prior Publication Data

US 2010/0148991 A1 Jun. 17, 2010

Related U.S. Application Data

(63) Continuation-in-part of application No. 12/333,885, filed on Dec. 12, 2008.

(51) Int. Cl.
*G01C 21/00* (2006.01)
*G01C 23/00* (2006.01)
*G08G 5/00* (2006.01)

(52) U.S. Cl.
CPC ............. *G01C 23/00* (2013.01); *G01C 21/00* (2013.01); *G08G 5/0021* (2013.01)

(58) Field of Classification Search
CPC ................................ G01C 23/00; G07C 23/00
USPC ........................................................ 701/211
See application file for complete search history.

(56) References Cited

U.S. PATENT DOCUMENTS

| 5,758,297 | A | 5/1998 | Gaultier |
| 5,844,503 | A | 12/1998 | Riley et al. |
| 5,978,715 | A | 11/1999 | Briffe et al. |
| 6,112,141 | A | 8/2000 | Briffe et al. |
| 6,542,796 | B1 | 4/2003 | Gibbs et al. |
| 6,633,810 | B1 | 10/2003 | Qureshi et al. |
| 6,799,095 | B1 | 9/2004 | Owen et al. |
| 6,879,886 | B2 * | 4/2005 | Wilkins et al. .................. 701/3 |
| 7,386,374 | B1 * | 6/2008 | Orf et al. ........................ 701/14 |
| 8,135,502 | B2 * | 3/2012 | Deleris et al. ................. 701/14 |
| 2006/0022845 | A1 | 2/2006 | Fischer |
| 2006/0142904 | A1 | 6/2006 | Caillaud et al. |

OTHER PUBLICATIONS

International Search Report and Written Opinion of the International Searching Authority of PCT/US2006/047319; dated May 27, 2008; 17 pages.

* cited by examiner

*Primary Examiner* — Sheetal R Paulson
(74) *Attorney, Agent, or Firm* — Patterson + Sheridan, LLP

(57) ABSTRACT

A display system for dynamically displaying aircraft flight information. The system includes a processor, memory, and a display. The processor is capable of communicating with the memory, the display, and a system environment of the aircraft. The processor is configured to display a flight map for the aircraft on the display, to evaluate state variable(s) dynamically representing state(s) in the aircraft system environment, and dynamically modify the flight map based at least in part on the evaluation.

15 Claims, 6 Drawing Sheets

DYNAMIC DISPLAY OF NAVIGATIONAL INFORMATION

CROSS-REFERENCE TO RELATED APPLICATIONS

This application is a continuation-in-part of U.S. patent application Ser. No. 12/333,885 filed on Dec. 12, 2008. The entire disclosure of the above application is incorporated herein by reference.

FIELD

The present disclosure relates generally to navigational displays and more particularly (but not exclusively) to dynamically displaying navigational data for a craft such as an aircraft or water vessel.

BACKGROUND

This section provides background information related to the present disclosure which is not necessarily prior art.

Aircraft pilots generally refer to aeronautical maps for flight path information. Flight maps, which may be digitally displayed, typically show departure and arrival locations, terrain, and landmarks on or near the flight path. An aircraft following a flight path may encounter various changes in terrain, weather, etc. and the pilot may need to react accordingly. A pilot may alter aircraft speed, altitude and/or other flight parameters in response to changing conditions along the flight path. Not all pilots follow the same procedures during flight. Airline-specific practices may vary in their requirements for pilots to follow at specific times relative to predefined events.

SUMMARY

This section provides a general summary of the disclosure, and is not a comprehensive disclosure of its full scope or all of its features.

In one implementation, the present disclosure is directed to a dynamic display system for dynamically displaying navigational information. The system includes a processor, memory, and a display. The processor is capable of communicating with the memory, with the display, and with a system environment of a craft as to which the navigational information is displayed. The processor is configured to display a navigational map for the craft on the display. The processor is further configured to evaluate one or more state variables dynamically representing one or more states in the craft system environment, and dynamically modify the navigational map based at least in part on the evaluation.

In another implementation, the disclosure is directed to a dynamic display system for dynamically displaying aircraft flight information. The system includes a processor, memory, and a display. The processor is capable of communicating with the memory, with the display, and with a system environment of an aircraft. The system environment includes a plurality of states relating to systems of the aircraft. The processor is configured to display a flight map for the aircraft on the display, evaluate one or more state variables dynamically representing one or more of the states, and dynamically modify the displayed flight map based at least in part on the evaluation and one or more rules provided by a user of the dynamic display system relating to the state variable(s).

In yet another implementation, the disclosure is directed to a method of displaying aircraft flight information. The method is performed by a dynamic display system including a processor in communication with memory and with a display. A flight map is displayed for the aircraft. The method includes obtaining one or more rules specified by a user of the dynamic display system, and accessing one or more state variables dynamically representing one or more states in a system environment of the aircraft. The accessing is performed at least in part by executing instructions provided by the user of the dynamic display system. The method further includes evaluating the state variable(s) relative to the rule(s), and based on the evaluating, modifying the displayed flight map.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In various implementations of the disclosure, a system is provided for dynamically displaying navigational information for a craft such as an aircraft, a spacecraft, a ship or other watercraft. The system, which is data-driven and rule-based, can provide for the display of information in a context-aware manner. Information that a navigator needs can be displayed to the navigator when he/she needs the information. Information not needed at a given time can be selectively filtered from the display. In various implementations, the system allows users, e.g., aircraft or ship providers, airlines, shipping lines, ship captains and/or pilots, to implement their own preferences and/or requirements for when and how data may be displayed by the system.

Figure 1:
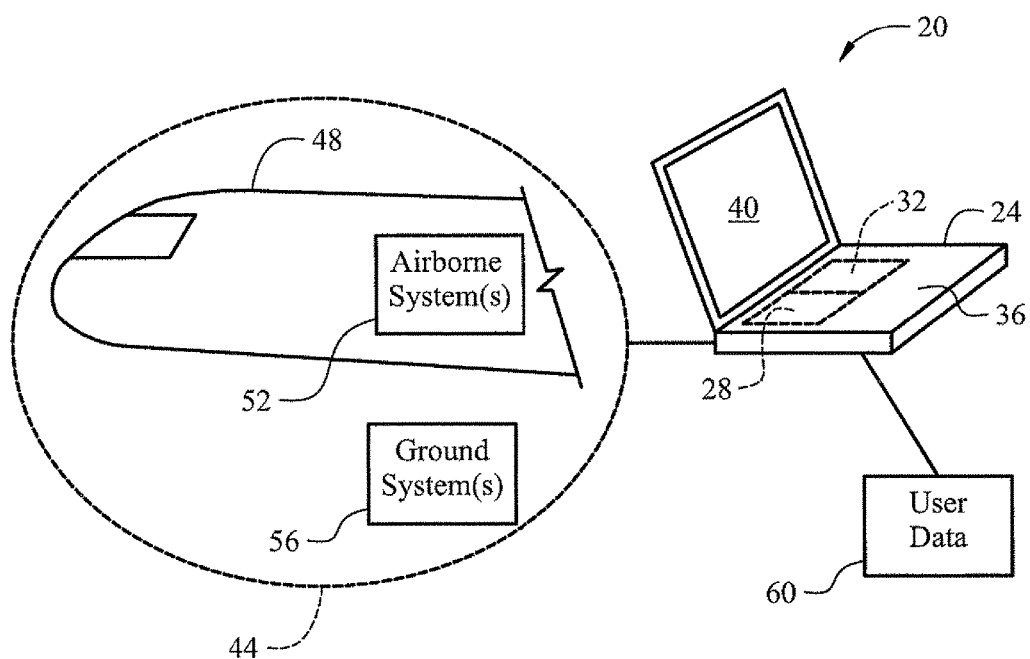
FIG. 1 is a conceptual diagram of a system for dynamically displaying navigational information in accordance with one implementation of the disclosure.

One configuration of a system for dynamically displaying navigational information is indicated generally in FIG. 1 by reference number 20. The system 20 is for displaying aircraft flight information and includes a computer, e.g., a laptop electronic flight bag (EFB) 24. The EFB 24 has a processor 28, memory 32, a keyboard 36 and/or other user input means, and a display 40. The EFB 24 is portable and may be used onboard or away from aircraft. It should be noted that other or additional computer configurations, including, e.g., an onboard navigational and/or other computing system of an aircraft, could be used to provide a dynamic display as further described below.

The EFB 24 is capable of communicating with a system environment 44 of an aircraft 48. The environment 44 includes various states in and/or relating to various airborne systems 52 and ground systems 56. The EFB processor 28 is configured to display a flight map on the display 40. When, for example, the aircraft 48 is in flight, the processor 28 evaluates one or more state variables dynamically representing one or more states in the aircraft system environment 44. State variables may represent a wide variety of states including, e.g., aircraft altitude, current aircraft location, direction, air speed, ground speed, pitch and other flight parameters, distance to a topographical feature, height of a topographical feature, aircraft fuel level, weather condition(s), time of day, traffic frequency, characteristics of airports, etc. The processor 28 dynamically modifies the displayed flight map based at least in part on one or more rules relating to the evaluated state variable(s). Such rules may specify, among other things, how and/or when a particular symbol is to be displayed on the flight map. For example, a state variable "DistToObject" may be dynamically evaluated as a distance from a current position of the aircraft to another object, e.g., an airport. A rule may specify that unless the distance represented by the variable "DistToObject" is below a predefined amount, a symbol for that object is not to be displayed on the flight map.

The dynamic display system 20 may refer to a plurality of rules and state variables in determining whether and how to display objects on a flight map. Additionally or alternatively, the display system 20 may include and refer to one or more data sources 60 provided by one or more users of the display system 20. Such user(s) may include a manufacturer of the aircraft 48, an airline or other provider of the aircraft 48, and/or a pilot of the aircraft 48. The data source(s) 60 may include one or more user definitions of state variables and/or one or more user-defined rules relating to state variable(s). The processor 28 may execute instructions provided in the data source(s) 60 to obtain one or more user-defined rules. The processor 28 may also execute instructions provided in the data source(s) 60 to evaluate a state variable periodically and/or occasionally, dependent on rule(s) to which the state variable pertains.

Figure 2:
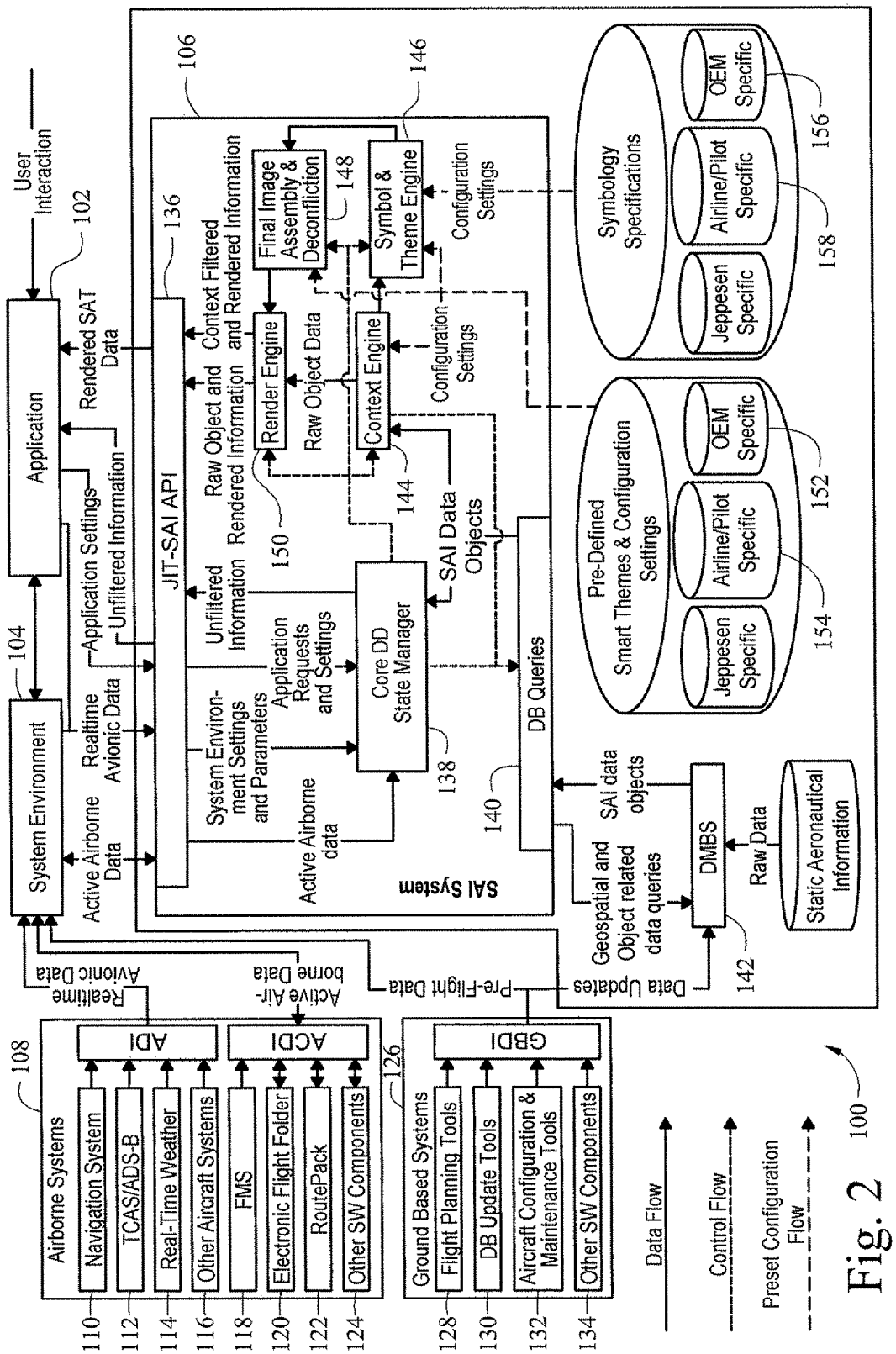
FIG. 2 is a logical architectural view of a framework for a dynamic display system in accordance with one implementation of the disclosure.

A logical architectural view of a framework for a dynamic display system is indicated generally in FIG. 2 by reference number 100. A pilot or other user activates a display application 102, e.g., on an EFB. The application 102 is in communication with an aircraft system environment 104 and with a dynamic display system 106. The system 106 is occasionally referred to as a supplemental aircraft information (SAI) system. The system environment 104 includes real-time avionic data from various airborne systems 108, including a navigation system 110, a traffic alert collision avoidance/automatic dependent surveillance-broadcast (TCAS/ADS-B) system 112, real-time weather data 114, and other aircraft systems 116. The environment 104 also includes active airborne data from a flight management system (FMS) 118, an electronic flight folder 120, a route pack 122, and other software components 124. The environment 104 also includes pre-flight data, which may be updated, e.g., before and/or during flight from various ground-based systems 126 such as flight planning tools 128, database update tools 130, aircraft configuration and maintenance tools 132, and other software components 134.

Information from the system environment 104 and user application 102 is available to the display system 106 via an application program interface (API) 136. Active airborne data, system environment settings and parameters, and application requests and settings are made available via the API 136 to a data-driven state manager 138 that manages the dynamic rendering of a flight map. Although not shown in FIG. 2, user-provided software for defining and handling user-provided dynamic state variables may also be made available to the state manager 138 via the API 136.

The state manager 138 may perform queries 140 against a database management system (DBMS) 142 to obtain additional aeronautical information for use in controlling the display of flight map information. The state manager 138 controls a context engine 144, a symbol and theme engine 146, a final image assembly and deconfliction engine 148, and a render engine 150 to provide raw object and rendered information and context-filtered and rendered information to the user application 102 via the API 136.

Manufacturer configuration settings 152 and/or airline/pilot configuration settings 154 may be predefined and made available to the dynamic display system 106. Manufacturer symbology specifications 156 and/or airline/pilot symbology specifications 158 also may be predefined and made available to the dynamic display system 106. In such manner, a user can provide custom rules relating to dynamic state variables, including but not limited to dynamic state variables defined by a user as described above.

Figure 3:
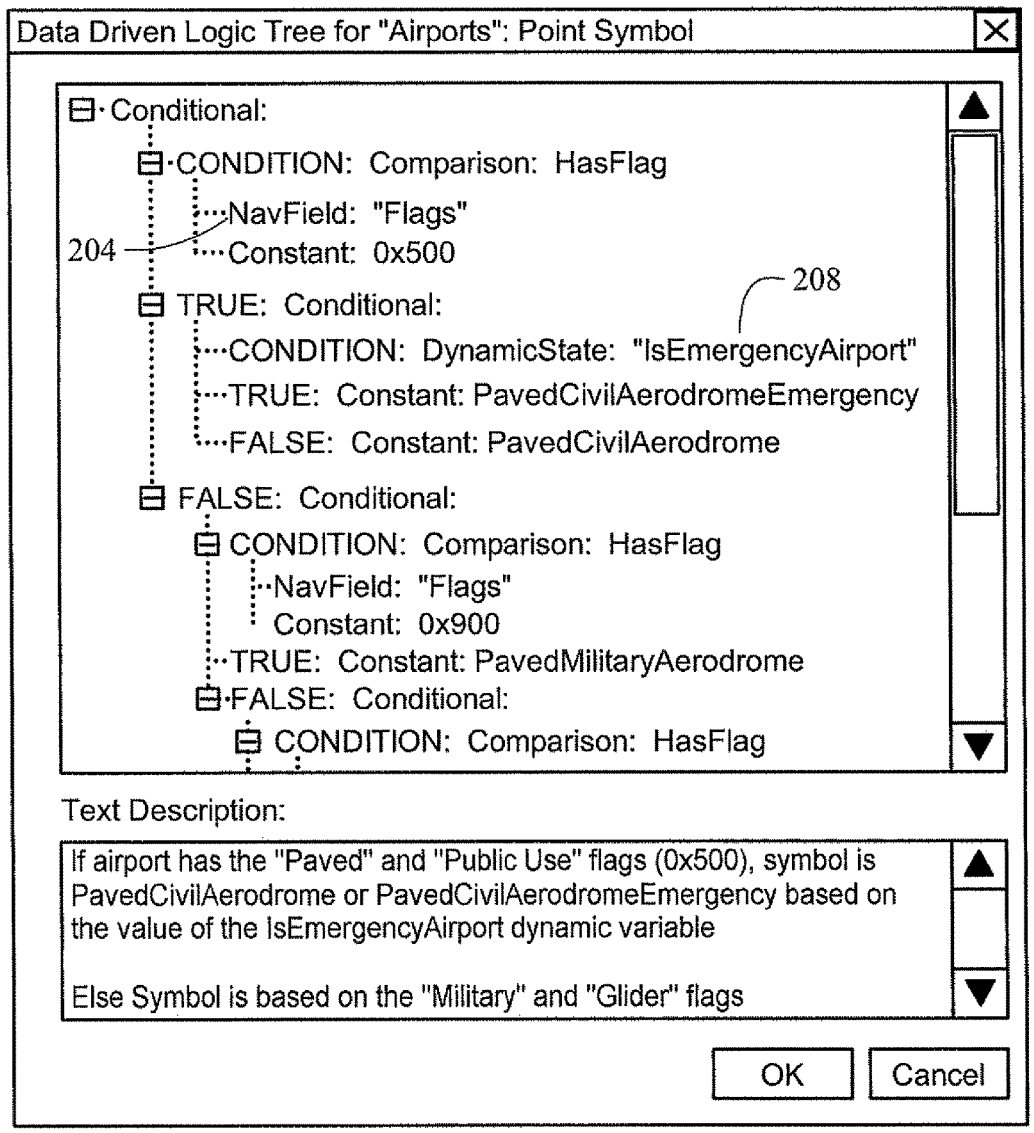
FIG. 3 is a screen shot of a logic tree in accordance with one implementation of the disclosure.

In various dynamic display system configurations, logic trees are used to specify rules for displaying data on a flight display. Such logic trees are driven by data, including dynamic state variables, to provide context-aware display of information. In various implementations an editor program is provided whereby a user may construct and/or edit a logic tree, for example, as indicated generally in FIG. 3 by reference number 200. In one implementation the editor program is written in C++ programming language, although other programming languages could be used. The exemplary logic tree 200 defines how and when a symbol for an airport and a label for the symbol are displayed. When a processor executes the logic tree 200, it accesses data fields such as "NavField" 204 from a raw airport data record. The processor also evaluates dynamic state variables such as "IsEmergencyAirport" 208. The logic tree 200 specifies that if a subject airport is flagged as being paved and public-use, then (based on a dynamic variable indicating whether the airport is an emergency airport) a symbol for a paved civil aerodrome or for a paved civil emergency aerodrome is to be displayed. Otherwise, a symbol type for the airport is to be determined in accordance with whether the airport is flagged as "military" or "glider". Other or additional parameters for rendering a symbol for the airport, e.g., parameters for size and/or color, may be defined in other or additional similarly structured logic trees.

In various implementations, a dynamic display system user, e.g., an aircraft manufacturer, may define dynamic parameters as state variables that can be incorporated into logic trees. Evaluation of such parameters may be accomplished, e.g., via a callback by the dynamic display system to software code provided by the user to evaluate a current value of the dynamic variable representing the dynamic parameter.

Logic trees and dynamic state variables may be used to define many different data-driven attributes of a dynamic display system in accordance with various implementations. For example, chart object filtering and display attributes may be defined, e.g., to specify when and/or how certain chart objects are displayed on a flight map. Configuration settings for the flight map may be dynamically changed based at least in part on the rules. Complex layout and depiction of labels, e.g., components and layout of a VOR (VHF Omnidirectional Range) label, may be performed dynamically. Different types of labels may be defined, for example, to indicate traffic frequency and/or radio frequency, and specified for display based, e.g., on proximity of an aircraft to an arrival destination. Chart layers and chart layer stacking order may be performed dynamically, e.g., to define an order in which chart layers are displayed. Thus, for example, a chart layer indicating a weather condition may be placed in a chart stack based at least in part on the particular weather condition. Various alerts and notifications may be displayed when considered appropriate by a display system user. For example, when an aircraft approaches a particular airport that the pilot is expected to call upon arrival, a message such as "Approaching Frankfurt Class C" could be displayed along with an appropriate radio frequency in accordance with the provided rules (e.g., logic tree and state variables) and current dynamic state. In some implementations an auto-zooming capability may be provided, e.g., based on one or more rules for different stages within a mission.

Figure 4A:
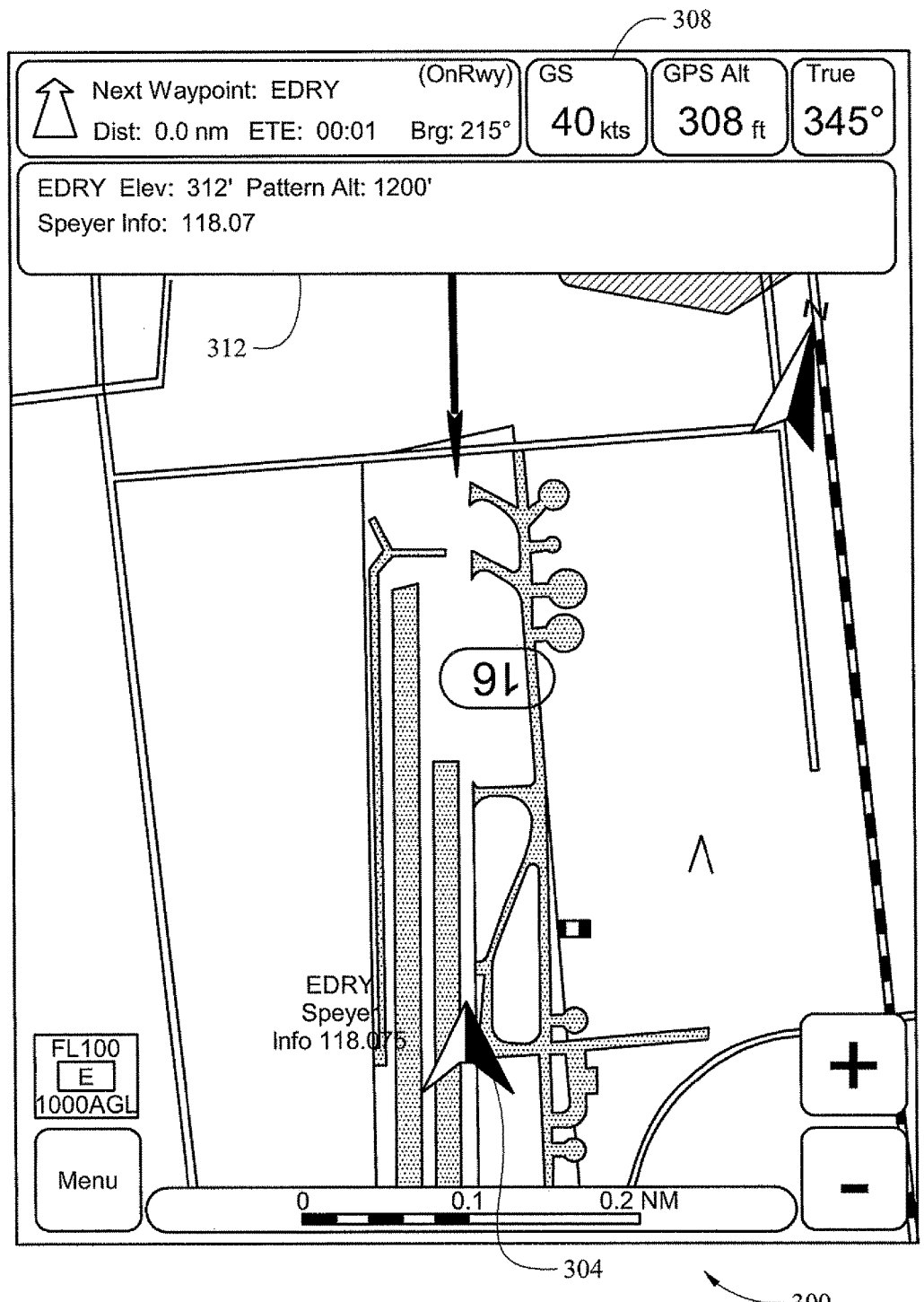
FIGS. 4A and 4B are screen shots of a flight map in accordance with one implementation of the disclosure.
Figure 4B:
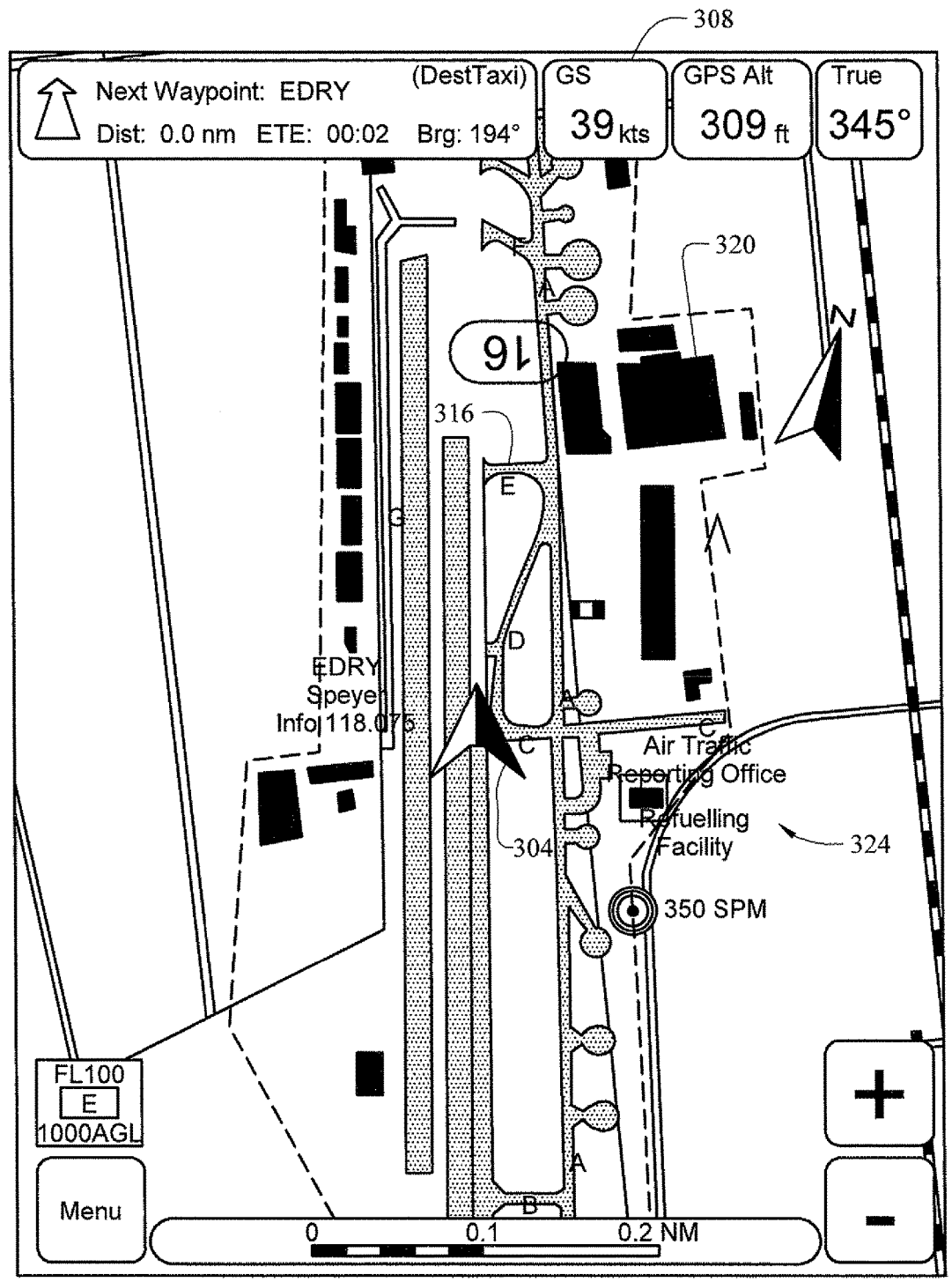

One example of a flight map that is changed in accordance with one implementation of the disclosure is indicated generally in FIGS. 4A and 4B by reference number 300. The map 300 is displayed in an aircraft that is indicated by an aircraft shape 304 on the map. Contents of the map 300 may be changed in accordance with a rule pertaining at least in part to aircraft velocity, which is a dynamic state of the aircraft. The map 300 is displayed as shown in FIG. 4A when the aircraft is in a touch-down phase and when the velocity, shown in an area 308, is greater than or equal to 40 knots. The map 300 as shown in FIG. 4A displays, e.g., elevation and altitude information 312.

The map 300 is displayed as shown in FIG. 4B when the aircraft is taxiing and traveling at velocity 308 less than 40 knots. Elevation and altitude information are not shown in FIG. 4B, but details are displayed that are not displayed in the map as shown in FIG. 4A. For example, runway information 316, airport buildings 320, and ground facilities information 324 are shown in FIG. 4B.

Figure 5:
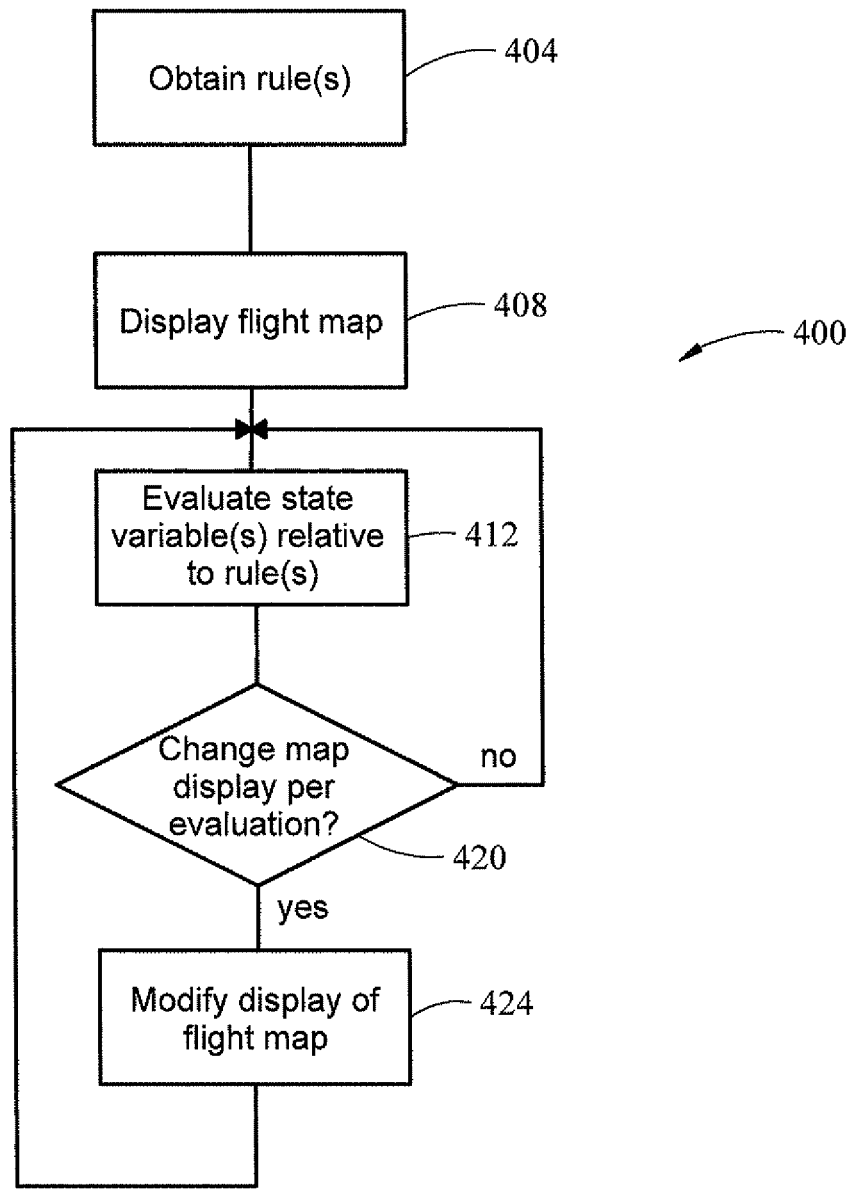
FIG. 5 is a flow diagram of a method of displaying navigational information in accordance with one implementation of the disclosure.

It will be appreciated by those skilled in the art that navigational and display systems used, e.g., in watercraft are different in various respects from those used in aircraft. It will also be appreciated, however, that the disclosure could be implemented, e.g., in relation to watercraft without departing from the principles of the present disclosure. One implementation of a method for displaying navigational information is indicated generally in FIG. 5 by reference number 400. The method 400 may be performed by a dynamic display system including a processor in communication with memory and with a display. It should be understood that the various processes of the method 400 do not necessarily have to be performed in the order set forth in FIG. 5. Furthermore, other or additional processes may be performed in connection with the processes shown in FIG. 5.

In process 404, one or more rules, e.g., specified by a user of the dynamic display system, are obtained. In process 408, a navigational map for a craft is displayed. In process 412, one or more state variables dynamically representing one or more states in a system environment of the craft are accessed and evaluated. The accessing may be performed at least in part, e.g., by executing instructions provided by the user of the dynamic display system. The state variables are evaluated relative to the one or more rules. If in process 420 it is determined that the navigational map is to be changed based on the evaluation, then in process 424 the display of the navigational map is modified. Control then may return to process 412.

The data-driven aspects of the foregoing display systems and methods make it possible for individual users to define a unique "look-and-feel" for their chart display. Custom rules can be defined for displaying context-sensitive information with having to perform changes to source code. This feature is in contrast to current display systems, which typically use hard-coded rules to define content and appearance, thus requiring software updates to change rules. The foregoing systems and methods are in contrast to current systems that typically perform filtering based only on scale (i.e., certain objects may be turned off when the display is zoomed out beyond a certain point.) Systems and methods in accordance with the disclosure can be used, e.g., during aircraft flight to enhance situational awareness during flight and can reduce workload for pilots. Such systems can entail fewer software updates and less maintenance than existing systems.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A navigational information display system for dynamically displaying and modifying context-aware craft navigational information during operation of the craft, the system comprising:
   one or more computer processors; and
   a non-transitory memory containing computer program code that, when executed by operation of one or more computer processors, performs an operation comprising:
      receiving real-time navigational information from a state manager;
      displaying a graphical user interface depicting the real-time navigational information on a display system;
      receiving a definition for a first dynamic state variable, comprising a specification of user-provided software code and a callback to the user-provided software code, wherein the callback can be executed to calculate a current value for the dynamic state variable;
      providing an editor program through which logic trees specifying rules for displaying data within the graphical user interface can be constructed;

receiving, within the editor program, a definition for a first logic tree specifying conditional logic for evaluating at least the first dynamic state variable to determine how and when to render a specified graphical symbol and a label corresponding to the graphical symbol within the graphical user interface;

receiving dynamic user requests for display of real time navigational information from a user input component;

modifying the display of real-time navigational information in response to the received dynamic user requests;

executing the callback to the user-provided software code to calculate the current value for the first dynamic state variable; and upon executing the first logic tree to evaluate the calculated current value for the first dynamic state variable using the conditional logic specified within the first logic tree, dynamically controlling the display of the real time navigational information on the display system to render the specified graphical symbol at a determined location within the graphical user interface.

2. The navigational information display system of claim 1, wherein the state manager is in communication with one or more engines selected from the group consisting of a context engine, a symbol and theme engine, a final assembly and deconfliction engine and a render engine, to provide raw object and rendered information and context-filtered and rendered information to the display system to a user.

3. The navigational information display system of claim 1, wherein the conditional logic within the first logic tree for evaluating at least the first dynamic state variable further defines how to select a symbol type of a plurality of different symbol types when rendering the specified graphical symbol within the graphical user interface.

4. The navigational information display system of claim 3, wherein the conditional logic within the first logic tree for evaluating at least the first dynamic state variable further defines parameters that control a size and a color of the specified graphical symbol rendered within the graphical user interface.

5. The display system of claim 1, wherein a data base management system includes a plurality of different user-defined logic trees.

6. A method of displaying context-aware craft navigational information, the method comprising:
receiving real-time navigational information from a state manager;
displaying a graphical user interface depicting the real-time navigational information on a display system, wherein the state manager is in communication with: (i) the display system, (ii) a user input component, (iii) a real-time system environment of the craft comprised of real-time airborne and ground-based information that define at least one state variable for the craft, and (iv) a data base management system;
providing an editor program through which logic trees specifying rules for displaying data within the graphical user interface can be constructed;
receiving, within the editor program, a definition for a first logic tree specifying conditional logic for evaluating at least one data field and the at least one state variable to determine how and when to render a specified graphical symbol and a label corresponding to the graphical symbol within the graphical user interface;

receiving dynamic user requests for display of real time navigational information from the user input component;

modifying the display of real-time navigational information in response to the received dynamic user requests; and upon executing the first logic tree to evaluate the conditional logic specified within the first logic tree, dynamically controlling the display of the real time navigational information on the display system to render the specified graphical symbol at a determined location within the graphical user interface.

7. The method of claim 6 further comprising modifying the displayed graphical user interface in real time based on user input.

8. The method of claim 7, wherein the craft is an aircraft and the real time navigational information is displayed within the graphical user interface as a flight map.

9. The method of claim 6, wherein the database management system includes a plurality of different user-defined logic trees.

10. The method of claim 6, further comprising:
receiving a definition for a first dynamic state variable, the definition comprising a specification of user-provided software code and a callback to the user-provided software code, wherein the callback can be executed to calculate a current value for the dynamic state variable; and
executing the callback to the user-provided software code to calculate the current value for the dynamic state variable.

11. The method of claim 10, wherein, when the first logic tree is executed, the conditional logic evaluates the calculated current value for the dynamic state variable.

12. A non-transitory computer-readable medium containing computer program code that, when executed by operation of one or more computer processors, performs an operation for displaying context-aware craft navigation information, the operation comprising:
receiving real-time navigational information from a state manager;
displaying a graphical user interface depicting the real-time navigational information on a display system, wherein the state manager is in communication with: (i) the display system, (ii) a user input component, (iii) a real-time system environment of the craft comprised of real-time airborne and ground-based information that define at least one dynamic state variable for the craft, and (iv) a data base management system;
providing an editor program through which logic trees specifying rules for displaying data within the graphical user interface can be constructed;
receiving, within the editor program, a definition for a first logic tree specifying conditional logic for evaluating at least one data field and the at least one dynamic state variable to determine how and when to render a specified graphical symbol and a label corresponding to the graphical symbol within the graphical user interface;
receiving dynamic user requests for display of real time navigational information from the user input component;
modifying the display of real-time navigational information in response to the received dynamic user requests; and
upon executing the first logic tree to evaluate the conditional logic specified within the first logic tree, dynamically controlling the display of the real time navigational information on the display system to render the specified graphical symbol at a determined location within the graphical user interface.

13. The computer program product of claim 12, wherein the data base management system includes a plurality of different user-defined logic trees.

14. The non-transitory computer-readable medium of claim 12, the operation further comprising:
   receiving a definition for a first dynamic state variable, the definition comprising a specification of user-provided software code and a callback to the user-provided software code, wherein the callback can be executed to calculate a current value for the dynamic state variable; and
   executing the callback to the user-provided software code to calculate the current value for the dynamic state variable.

15. The non-transitory computer-readable medium of claim 14, wherein, when the first logic tree is executed, the conditional logic evaluates the calculated current value for the dynamic state variable.

* * * * *

UNITED STATES PATENT AND TRADEMARK OFFICE
CERTIFICATE OF CORRECTION

PATENT NO. : 10,371,547 B2
APPLICATION NO. : 12/359079
DATED : August 6, 2019
INVENTOR(S) : Sven D. Aspen et al.

Page 1 of 1

It is certified that error appears in the above-identified patent and that said Letters Patent is hereby corrected as shown below:

In the Claims

In Column 7, Line 44, in Claim 5, delete "data base" and insert -- database --, therefor.

In Column 7, Line 58, in Claim 6, delete "data base" and insert -- database --, therefor.

In Column 8, Line 49, in Claim 12, delete "data base" and insert -- database --, therefor.

In Column 9, Line 5, in Claim 13, delete "data base" and insert -- database --, therefor.

Signed and Sealed this
Tenth Day of March, 2020

Andrei Iancu
*Director of the United States Patent and Trademark Office*